United States Patent [19]

Rose et al.

[11] 4,040,403

[45] Aug. 9, 1977

[54] AIR-FUEL MIXTURE CONTROL SYSTEM

[76] Inventors: William Lester Rose, 2114 Rhonda Street; Herbert Joe Johnson, 1250 Bluebell Street, both of Oxnard, Calif. 93030

[21] Appl. No.: 634,625

[22] Filed: Nov. 24, 1975

Related U.S. Application Data

[63] Continuation-in-part of Ser. No. 444,361, Feb. 21, 1974, Pat. No. 3,931,801.

[51] Int. Cl.² ............... F02M 17/18; F02M 17/22
[52] U.S. Cl. ............... 123/133; 123/134; 123/139 AW; 123/139 BG; 261/69 A; 261/119 A
[58] Field of Search ............... 123/133, 134, 139 AW, 123/139 BG, 119 A; 261/69 A, 52, DIG. 58, DIG. 65, 121 R

[56] References Cited

U.S. PATENT DOCUMENTS

| | | | |
|---|---|---|---|
| 2,448,131 | 8/1948 | Williams | 261/69 A |
| 2,672,329 | 3/1954 | Zarnak | 261/69 A |
| 2,742,886 | 4/1956 | McPherson | 123/133 |
| 2,954,020 | 9/1960 | Ball | 123/139 AW |
| 3,800,533 | 4/1974 | Zankowski | 123/134 |

Primary Examiner—Ronald H. Lazarus
Attorney, Agent, or Firm—Ralph B. Pastoriza

[57] ABSTRACT

Method and means are provided for effecting the controlled vaporization of a liquid fuel to simplify the ability to control a specific air-fuel ratio for an internal combustion engine. The invention contemplates two basic operations: first, a vaporized fuel is provided in which the fuel content is precisely known. This is accomplished by vaporizing liquid fuel with a diluent gas and separating out any fuel droplets so that the vaporized fuel is provided at the dew point. Second, orifice-venturi combination meters are incorporated in the inlet air and fuel flow paths providing respective air and fuel pressure signals which, when balanced against each other, establish a desired air-fuel ratio over a desired operating range of the internal combustion engine.

12 Claims, 3 Drawing Figures

AIR-FUEL MIXTURE CONTROL SYSTEM

This applicaton is a continuation-in-part of our copending patent application, Ser. No. 444,361 filed Feb. 21, 1974, now U.S. Pat. No. 3,931,801 and entitled FUEL VAPORIZER AND CONTROL SYSTEM.

This invention is directed to a method and means for effecting the controlled vaporizing of a liquid fuel and controlling the flow rate of the fuel relative to the inlet air flow rate to provide a desired air-to-fuel mixture for an internal combustion engine.

BACKGROUND OF THE INVENTION

Any new carburetion system for an internal combustion engine to be useful at all, must perform at least as well as known devices in the areas of fuel economy and exhaust emission. As will become evident, both economy and exhaust emissions are heavily dependent upon predetermined air-to-fuel ratios.

It is generally accepted in the field that reduction of harmful emissions could be accomplished by delivering a homogeneous mixture of air and fuel to the engine thereby allowing lean mixtures to be burned with complete combustion. Known state-of-the-art carburetion-induction devices utilized with the conventional internal combustion engine are capable of providing complete combustion with air-to-fuel ratios of 18.5:1. Air to fuel ratios in this range are effective in reducing hydrocarbons and carbon monoxide but do little to effectively reduce oxides of nitrogen.

If the air-to-fuel ratio were further increased to reduce oxides of nitrogen the lean limit is reached. This limit occurs when the air-to-fuel mixture in a cylinder can no longer support complete combustion. The result is a sharp increase in the emission of hydrocarbons. Although it is little known, it has been possible for applicants to achieve air-to-fuel ratios of 21:1 using a homogeneous mixture of dry fuel vapor and air without reaching the lean limit. This high air-to-fuel ratio results in drastic reductions of oxides of nitrogen while maintaining low hydrocarbon and carbon monoxide levels.

It should be recognized that the above discussion applies at relatively high power settings for the engine. For example, an RPM greater than 60% of maximum torque RPM and power at a given RPM greater than 30% of maximum torque RPM. At lower power and RPM, the lean limit decreases reaching a minimum of about 16:1 air-to-fuel ratio at idle and increasing with increasing power and RPM to the 21:1 discussed above at highway level road loads.

In view of the foregoing, it is not only necessary for a system to be susceptible to tight control of the air-to-fuel ratio, but it must also have the flexibility to allow a change in the air-to-fuel ratio which changes with changing load conditions. If the system does not have this flexibility but does have the ability to maintain a constant air-to-fuel ratio, it would only really be effective over a desired or given operating range and would not function well outside such range.

Theoretically, the higher the air-to-fuel ratio, the more thermally efficient an engine will perform. This theory is generally true for the higher power levels discussed above. Under lighter loads and speeds such as idle and low speed cruise, thermal losses and low compression levels of the fuel change resulting in reduced efficiencies with increasing air-to-fuel ratio. The preferred air-to-fuel ratios for reduced emissions are very near the preferred levels for best economy and efficiency. Thus, it is apparent that the air-to-fuel ratio must be controlled as a function of load and speed for optimum economy and efficiency.

The foregoing provision of lean air-to-fuel ratios in combination with a homogeneous mixture of dry fuel vapor and air reduce flame propagation speeds and allows the use of high compression and minimum spark together with the best torque spark advance which results in a substantially improved fuel consumption coupled with much improved emissions.

In providing a proper system for controlling the air-to-fuel ratio, it is necessary that one know the exact percentage of fuel in the vaporized fuel mixed with the incoming air. The problem involved is not in being able to vaporize a sufficient quantity of fuel, but rather that of controlling the vaporization such that the amount of fuel vaporized can be determined and thus held constant. The achievement of a dew point of a vapor and a diluent is an excellent method of attaining such a control. If a mixture of fuel vapor and diluent is at dew point and the temperature of the mixture is known, the percentage of a given vapor to diluent is known.

There have been many means devised and patented for vaporizing fuel, but none is known to control vaporization by assuring the achievement of a dew point prior to our invention as set forth in the heretofore referred to copending patent application. Without such a control, except where the fuel is predetermined prior to vaporization, it is next to impossible to precisely control the air-to-fuel ratio so essential to low exhaust pollutents and improved economy.

BRIEF DESCRIPTION OF THE PRESENT INVENTION

Bearing all of the foregoing in mind, the present invention contemplates a method and means for automatically controlling the fuel-to-air mixture or ratio for an internal combustion engine over a desired operating range of the order of 21:1 to the end that optimum efficiency results with minimum pollutents in the exhaust.

In the even the precise percentage of fuel passed for mixture with incoming air is not known or not initially controlled, the invention also contemplates in combination with the fuel to air ratio control system, a method and means for providing a controlled fuel vapor wherein the percentage of fuel is precisely known and can be held constant. Essentially, the provision of a controlled vaporized fuel is carried out as described in our heretofore referred to copending patent application wherein liquid fuel is mixed with a diluent such as the exhaust gas of the internal combustion engine to vaporize the fuel, droplets being separated out from the vaporized fuel so that it passes along a given direction at dew point.

With respect to the control of the air-to-fuel ratio, incoming air is passed through an orifice-venturi meter combination to result in air pressure signals with variations in the air flow per unit time. The fuel vapor at dew point in turn is passed through an orifice-venturi meter combination to result in fuel pressure signals with variations in the fuel flow per unit time. The air pressure signal is then balanced against the fuel pressure signal when a desired air-to-fuel flow is established to thereby maintain the air-to-fuel ratio constant.

A further variation of the air orifice-venturi meter combination can be effected in accord with this invention to change the pressure signals with changes in the flow rates so that the air-to-fuel ratio can be changed from a constant value for various conditions outside the desired operating range to provide optimum engine efficiency.

BRIEF DESCRIPTION OF THE DRAWINGS

A better understanding of the method and apparatus of this invention will be had by referring to the accompanying drawings in which.

DETAILED DESCRIPTION OF THE INVENTION

The essence of the method of the present invention for maintaining a desired ratio of air-to-fuel mixture for an internal combustion engine includes the steps of: first, providing fuel in a vaporized state wherein the percentage of fuel is precisely known; second, passing the vaporized fuel along a direction to mix with incoming air; third, generating an air signal constituting a function of air flow per unit time; fourth, generating a fuel signal constituting a function of fuel flow per unit time; and fifth, controlling the fuel flow per unit time along said direction in accordance with a given relationship between the generated signals to thereby maintain a desired ratio of air-to-fuel mixture for use in the internal combustion engine.

As mentioned heretofore, if the percentage of fuel is not precisely known, it is next to impossible to control the air-to-fuel mixture. Thus, where a liquid fuel is used as in a conventional gasoline internal combustion engine, the method of this invention also contemplates mixing the vaporized fuel with a diluent gas such that the diluent is saturated with fuel vapor thereby providing fuel vapor at the dew point so that effectively, the percentage of fuel in the diluent is known and is maintained constant.

Figure 1:
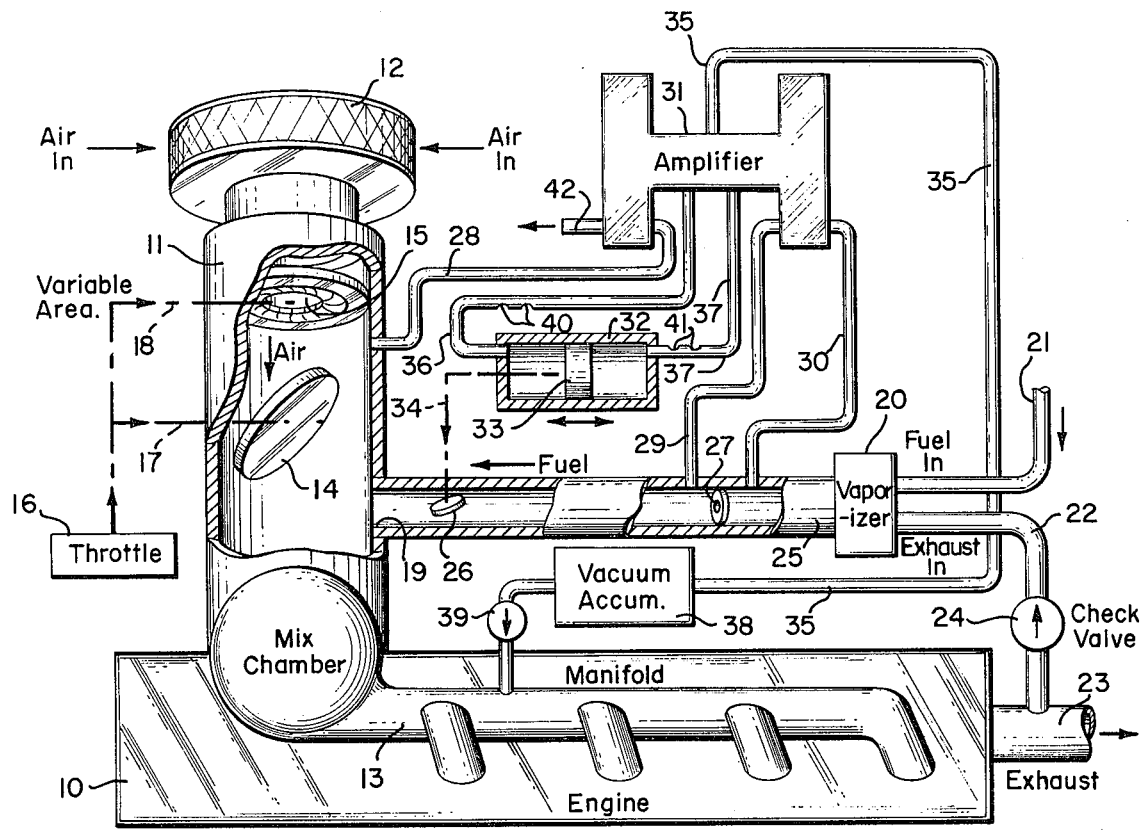
FIG. 1 is a diagrammatic showing only of an internal combustion engine in which the fuel vaporizer and fuel-to-air ratio control system of this invention have been incorporated.

Referring now specifically to FIG. 1 there is shown apparatus for carrying out the foregoing method with respect to a conventional internal combustion engine. In this respect, the engine is diagramatically indicated at 10. In accord with the invention, a pipe section 11 is arranged to be inserted between the air intake 12 and the input manifold 13 of the engine 10. As shown in the broken away portion, the pipe section 11 incorporates an inlet air valve means in the form of a butterfly valve 14 and including a orifice-venturi meter combination 15. The orifice portion of this combination 15 is variable in size similar to the iris of a camera lens. As indicated by the dot-dashed lines, the butterfly valve 14 is operated to various set positions by the throttle schematically indicated by the block 16. Also, as indicated by the dashed-dot line 18, the size of the variable orifice in the orifice-venturi combination 15 is controlled by the throttle 16.

Downstream of the air inlet valve means in the pipe section 11 is a fuel vapor inlet 19 for passing fuel at dew point from a vaporizer unit 20 shown as a block in the right central portion of FIG. 1. Fuel vaporizer 20 includes a liquid fuel inlet 21, an exhaust gas inlet 22 which may be piped from the exhaust outlet 23 for the engine 10 through a check valve 24, and a fuel vapor outlet or line 25.

A fuel valve 26 including an orifice-venturi meter combination 27 is incorporated in the fuel outlet line 25 as shown in the broken away portions.

The ratio of air to fuel vapor is precisely controlled in accord with this invention by utilizing the pressure outputs of the orifice-venturi meter combinations in the respective air inlet and fuel vapor lines. Towards this end, there is provided a small conduit 28 from the pipe section 11 downstream of the variable orifice 15 in the air inlet providing an air pressure signal in accordance with the setting of the inlet valve means. Similarly, there is provided a small conduit 29 and return conduit 30 on either side of the orifice 27 providing a fuel pressure signal in accordance with the setting of the fuel valve. The areas or openings of the respective orifices in the air inlet valve orifice-venturi meter and fuel valve orifice-venturi meter are sized such as to equalize this air pressure signal and fuel pressure signal when a desired air-to-fuel ratio is established. Thus, by controlling one or the other of the valves in a manner to maintain the air pressure signal equal to or balanced against the fuel pressure signal, a constant air-to-fuel ratio will be maintained over a desired operating range.

The foregoing control is accomplished by pressure differential responsive means receiving the air pressure signal and fuel pressure signal and connected to the fuel valve to automatically change the setting of the fuel valve whenever a pressure differential exists between the air pressure signal and fuel pressure signal to thereby change the flow rate of fuel in a direction to equalize the air pressure signal and fuel pressure signal. Thus, as shown in FIG. 1 the air pressure signal in conduit 28 and fuel pressure signal in conduit 29 pass to an amplifier 31 which functions to amplify any pressure difference and apply the same to opposite ends of a cylinder 32 containing a double acting piston 33 connected to the fuel valve 26 as indicated by the dashed line 34.

As will become clearer as the description proceeds, the amplifier 31 includes a slide valve having an inlet connected to a source of vacuum by means of a line 35, and first and second outlets 36 and 37 connecting to the opposite sides of the cylinder 32 as shown. In the particular embodiment shown, the vacuum source for the inlet line 35 is derived from the engine manifold 13 to a vacuum accumulator 38 and check valve 39.

In order that the proper fuel valve position be maintained by the double acting piston under rapid pressure changes during rapid changes in inlet air flow, there are provided small bleeder openings such as indicated at 40 and 41 in the outlet lines 36 and 37 passing into the opposite ends of the cylinder 32 for the double acting piston 33. As will be subsequently described, the amplifier 31 includes diaphragm means balancing the air pressure signal against the fuel pressure signal, the air pressure signal in line 28 acting on one side of the diaphragm, the other side being open to atmosphere as by outlet 42, the fuel pressure signal in line 29 also acting on the diaphragm means in an opposite sense the other side connecting to the return line 30.

Figure 2:
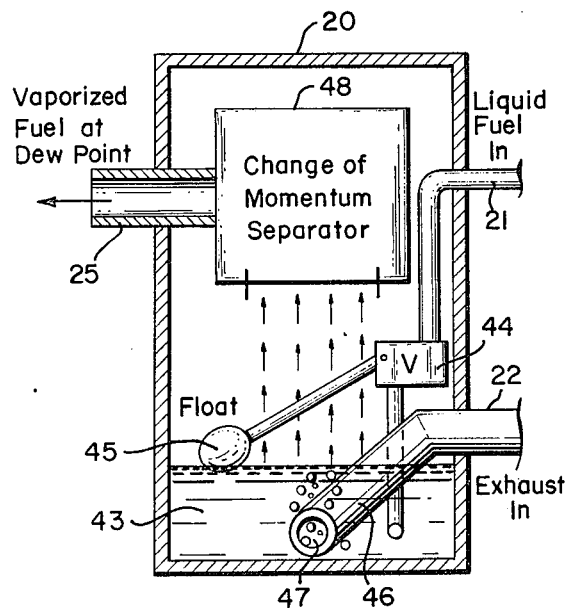
FIG. 2 is an enlarged view partly in cross section of the vaporizer unit of FIG. 1; and, FIG. 3 is an enlarged fragmentary cross section of an amplifier portion of the fuel-to-air ratio control system in FIG. 1.

Referring now to FIG. 2, details of the vaporizer unit 20 described in FIG. 1 for providing fuel vapor at dew point in the line 25 are shown. Thus, the unit 20 comprises a closed chamber receiving the liquid fuel inlet line 21 providing a reservoir of liquid fuel as indicated at 43. A level responsive means in the form of a float valve 44 with associated float 45 maintains the level of the liquid fuel 43 at a given level so that incoming exhaust gas in the exhaust inlet 22 can be bubbled up through the liquid fuel 43 and vaporize the same. This bubbling action is accomplished by an exhaust pipe connecting means 46 passing through a portion of the chamber and thence extending into the liquid fuel 43 to terminate beneath the surface of the liquid fuel. The terminal end of the connecting means 46 has a plurality of small outlet openings 47 so that exhaust gases can only escape into the chamber by bubbling up through the liquid fuel.

A separating means shown by the block 48 functions to remove any droplets from the fuel in such a manner that vaporized fuel at dew point passes through the fuel outlet line 25. The separator 48 may be a change of momentum separator in which the vaporized fuel is caused to swirl about a curved path or may incorporate baffles to cause the fuel to traverse a path which changes directions.

The structure described FIG. 2 is similar to that in our copending patent application for providing supersaturated fuel vapor or fuel vapor at the dew point. As mentioned heretofore, it is vitally important in order that a precise control of air-to-fuel ratio be realized that the exact amount of fuel in the fuel vapor be known. By thus providing fuel at dew point, the quantity of fuel is constant. In furtherance of quantisizing the fuel, the liquid fuel temperature is held substantially constant prior to mixing with the exhaust gas or diluent gas. No problem is encountered in this respect since most internal combustion engines are water cooled and the temperature of the engine and the liquid fuel remains at a given value. Similarly, the incoming diluent or exhaust gas in the line 22 will be substantially constant and is so maintained.

Figure 3:
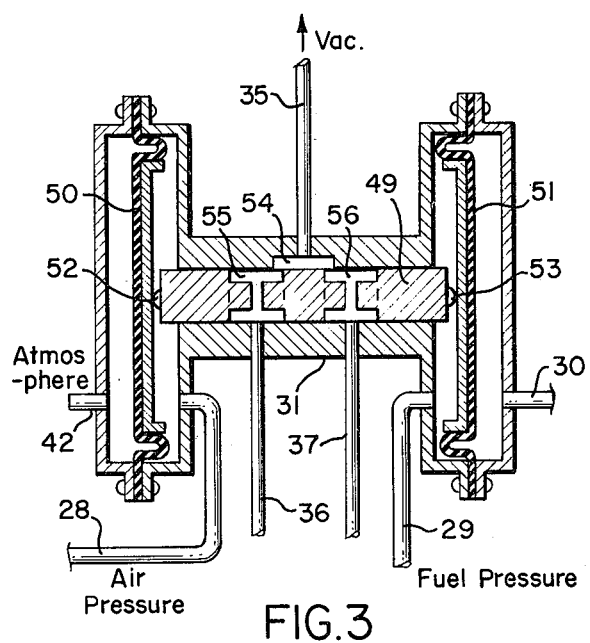

Referring now to FIG. 3, details of the amplifier 31 described in FIG. 1 are shown. Thus, the slide valve heretofore referred to is indicated at 49 and is arranged to be urged in a left or right direction as viewed in FIG. 3 by diaphragm means 50 and 51 engaging opposite sides of the slide valve as at 52 and 53. The incoming vacuum line communicates with a passage 54 which in turn overlaps passages 55 and 56 in the slide valve 49 when the same is in a centered position. Vacuum is thus applied equally to the lines 36 and 37 connecting to the outlets of the amplifier 31.

It will be appreciated that the slide valve 49 is maintained in a center position when the pressure applied against the diaphragm 50 from the air pressure signal conduit 28 exactly balances the pressure applied across the diaphragm 51 from the fuel pressure signal in the conduit 29. However, should there exist a differential in these pressures, the slide valve 49 will move in one direction or the other to apply more vacuum to one of the other of the lines 36 and 37, the passage 54 overlapping to a greater extent one of the passages 55 or 56 than the other.

As described in FIG. 1, the amplified differential pressures are applied to the double acting piston 33 to move this piston in one direction or the other and thus change the setting of the fuel valve 26 in a direction to again equalize the air pressure and fuel pressure signals in the conduits 28 and 29 applied to the amlifier. The double acting piston 33 will thus be maintained in its moved position and the fuel valve will be maintained at its new setting. It will be recalled that so long as these pressures are exactly balanced against each other, a constant air-to-fuel ratio is maintained.

OPERATION

In operation, it will be understood that the mass rate of flow of a fluid across the orifice-venturi meter combination of the types utilized in the air inlet and fuel line of FIG. 1 is a function of the discharge coefficient the meter, the area or size of the orifice, the density of the air or fuel as the case may be, and the pressure drop across the meter.

For a given design of meter, the discharge coefficient and orifice size or area remain constant. Therefore, the pressure drop across the meter is a function of the mass rate of flow through the meter and the density of the fluid flowing. Since the density of either the air or fuel is known, the mass rate of flow can be determined if the pressure drop is known.

From the foregoing, it will be evident that two different mass rates of flow can be measured by two different designed meters where both meters have identical pressure drops by simply making the size or area of one of the meters different from that of the other. It will also be seen that the ratio between the two rates of flow measured by two meters remains constant regardless of the particular flow rates. Therefore, by proper attention to the size or areas of the orifices, two meters can be built wherein one measures fuel and one air, such that whenever the pressure drop of the two meters is equal, a constant air-to-fuel ratio is attained. Moreover, it is possible to vary the air-to-fuel ratio in accordance with the rate of flow by varying the area or size of one of the orifices with variations in rate of flow.

Accordingly, if it is desired for the engine of FIG. 1 to maintain an air-to-fuel ratio of, for example, 21:1, the orifice 15 in the air inlet valve means and the orifice 27 in the fuel valve are sized relatively to each other to establish this ratio when the pressure drops as detected by the pressure signals in the conduits 28 and 29 respectively are equal.

With the foregoing criteria established, it will now be evident that when the air inlet flow is increased as by operating the throttle 16 to vary the valve 14, the increased drop in the air pressure signal will be conducted by conduit 28 directly to the amplifier 31 thereby causing the slide valve to move to the right as viewed in FIG. 3 and thus apply more vacuum to the line 36 and less vacuum to the line 37. With greater vacuum on the line 36 than in line 37, the double acting piston 33 will move to the left as viewed in FIG. 1 and open the fuel valve 26 to a greater extent to thereby re-establish the desired air-to-fuel ratio.

Similarly, when the air inlet valve is closed down there will be an effective increase in the air pressure signal in conduit 28 which will move the diaphragm means 50 illustrated in FIG. 3 to the left to provide more vacuum in the outlet line 37 than in the outlet line 36. The double acting piston 33 of FIG. 1 will thus move to the right and correspondingly close down the fuel valve 26 thereby changing the fuel pressure signal in conduit 29 until balance is re-established between the air pressure and fuel pressure signals. Thus again the desired air-to-fuel ratio is maintained.

It will be appreciated from the foregoing that a constant air-to-fuel ratio can be maintained over a desired operating range of the engine. However, in those instances where the engine is idling or running extremely slowly outside the normal desired range at highway speeds, optimum efficiency of the engine results with a lower air-to-fuel ratio all as described heretofore. For these latter contitions outside the desired operating range, the actual area or size of the orifice 15 in the air intake can be automatically changed by the mechanical connection 18 to the throttle 16 so that when the throttle 16 is closed, this action will come into play to change the effective area or size of the orifice and thus establish a new air-to-fuel ratio when the air pressure signal is balanced against the fuel pressure signal. Of course, when the RPM of the engine is increased to the desired operating range, then the area of the orifice 15 is maintained constant.

The term "orifice-venturi meter combination" as used herein and in the appended claims is understood to cover either a single orifice or a single venturi section or a combination of both.

From the foregoing description, it will be evident that the present invention has provided not only a unique means for providing fuel in which the fuel density or content is precisely known but wherein as a consequence, it is possible to precisely control the air-to-fuel ratio supplied to the engine all to the end that vastly improved engine operation is achieved and pollutents in the exhaust are minimized.

What is claimed is:

1. A method of vaporizing fuel and maintaining a desired ratio of air to fuel mixture in an internal combustion engine including the steps of:
    a. holding the temperature of a liquid fuel and a diluent gas substantially constant prior to mixing:
    b. mixing said diluent gas with said liquid fuel such that an excess of fuel is provided to super saturate the gas with fuel;
    c. separating out fuel droplets from the super saturated gas by passing the mixture of diluent gas and liquid fuel through a change of momentum separator to provide gas saturated with vaporized fuel resulting in fuel vapor at the dew point;
    d. passing the fuel vapor at dew point along a direction to mix with incoming air;
    e. generating an air signal constituting a function of the air flow per unit time;
    f. generating a fuel signal constituting a function of the fuel flow per unit time while in the vaporized state; and
    g. controlling the fuel flow per unit time along said direction in accordance with a given relationship between the generated signals to thereby maintain a desired ratio of air-to-fuel mixture in said internal combustion engine.

2. The method of claim 1, in which said diluent gas is taken from the exhaust of said internal combustion engine.

3. The method of claim 1, in which said generated signals are pressure signals provided by:
    a. passing the incoming air flow through a venturi-orifice meter combination to result in air pressure variations with variations in the air flow per unit time;
    b. passing the fuel through a venturi-orifice meter combination to result in fuel pressure variations with variations in the fuel flow per unit time; and
    c. balancing the air pressure signal against the fuel pressure signal when a desired air-to-fuel flow is established.

4. A fuel vaporizer and control system comprising, in combination:
    a. a pipe section arranged to be inserted between the air intake and input manifold of an internal combustion engine, said pipe section including an air inlet valve means for controlling inlet air flow and a fuel vapor inlet, said air inlet valve means including an orifice-venturi meter combination providing an air pressure signal in accordance with the setting of the inlet valve means;
    b. a vaporizer unit including a closed chamber having a liquid fuel inlet connected to receive liquid fuel for said engine, an exhaust gas inlet connected to receive exhaust gases from said engine, and a fuel vapor outlet;
    c. a liquid fuel reservoir in said chamber,
    d. level responsive means within said chamber to maintain the level of liquid fuel in said chamber at a given level;
    e. exhaust pipe connecting means passing from said exhaust gas inlet through a portion of said chamber and thence extending into said liquid fuel to terminate beneath the surface of said liquid fuel, the terminal end of said connecting means beneath said liquid level including outlet means so that exhaust gases can only escape into said chamber by bubbling up through said liquid fuel;
    f. separating means in said chamber, said fuel vapor outlet passing from said chamber at a point following the separating means and connecting into said fuel vapor inlet in said pipe section;
    g. a fuel valve for controlling the flow of vaporized fuel into said fuel vapor inlet, said fuel valve including an orifice-venturi meter combination providing a fuel pressure signal in accordance with the setting of said fuel valve, the areas of the respective orifices in the air inlet valve orifice-venturi meter and fuel valve orifice-venturi meter being sized such as to equalize said air pressure signal and fuel pressure signal when a desired air-to-fuel ratio is established; and,
    h. control means conected to said air inlet valve means and fuel valve responsive to the relative flows of air and fuel respectively therethrough to maintain a desired ratio of air to fuel whereby hot exhaust gases pass through the exhaust pipe connecting means and bubble through the liquid fuel to vaporize the same, the vaporized fuel passing through the separating means to thereby remove any liquid droplets not vaporized so that substantially only vaporized fuel at dew point passes through said fuel valve into said fuel inlet in said pipe section to then mix with air passing through said air inlet valve means and provide an explosive air and fuel mixture at said desired ratio for said engine, said control means including a pressure differential responsive means receiving said air pressure signal and fuel pressure signal connected to said fuel valve to automatically change the setting of said fuel valve whenever a pressure differential exists between said air pressure signal and said fuel pressure signal to change the flow rate of fuel in a direction to equalize said air pressure signal and fuel pressure signal whereby the established air-to-fuel ratio is maintained over a desired operating range of said internal combustion engine.

5. A system according to claim 4, in which said exhaust inlet to said vaporizer includes a check valve to block reverse flow of gases from said chamber.

6. The subject matter of claim 4, in which said pressure differential responsive means includes a cylinder having a double acting piston connected to said fuel valve for changing the setting of said fuel valve in one direction or the other in response to movement of said piston in said cylinder in one direction or the other; and an amplifier means including a slide valve having an inlet and first and second outlets, said inlet being connected to a source of vacuum and said outlets being connected respectively to opposite ends of said cylinder, movement of said slide valve from a center position increasing the vacuum applied to one outlet and decreasing the vacuum applied to the other outlet, said amplifier further including pressure responsive diaphragm means positioned to engage said slide valve and having inlet passages on opposite sides connected respectively to receive said air pressure signal and fuel pressure signal whereby movement of the slide valve as a result of a differential pressure across said diaphragm means applies an amplified differential pressure across said double acting piston in said cylinder.

7. The subject matter of claim 6, including a vacuum accumulating chamber connected between the manifold of said internal combustion engine and the inlet of said slide valve to provide said source of vacuum.

8. The subject matter of claim 6, in which small bleeder holes are provided in the connection between said outlet and opposite ends of said cylinder for said double acting piston to permit the proper fuel valve position to be maintained by said double acting piston under rapid pressure changes during rapid changes in inlet air flow.

9. An air-fuel mixture control system for an internal combustion engine including, in combination, an air inlet valve means for controlling inlet air flow per unit time and including an orifice-venturi meter combination providing an air pressure signal in accordance with the setting of the air inlet valve means; a fuel valve for controlling fuel flow per unit time and including an orifice-venturi meter combination providing a fuel pressure signal in accordance with the setting of said fuel valve, the areas of the respective orifices in the air inlet valve orifice-venturi meter and fuel valve orifice-venturi meter being sized such as to equalize said air pressure signal and fuel pressure signal when a desired air-to-fuel ratio is established; differential responsive means receiving said air pressure signal and fuel pressure signal connected to said fuel valve to automatically change the setting of said fuel valve whenever a pressure differential exists between said air pressure signal and fuel pressure signal to change the flow rate of fuel in a direction to equalize said air pressure signal and fuel pressure signal whereby the established air-to-fuel ratio is maintained over a desired operating range of said internal combustion engine, the orifice in said orifice-venturi meter combination in said air inlet valve means being variable in size; and means coupled to said orifice and responsive to said air flow such that the air to fuel ratio is automatically changed for certain settings of said inlet valve means.

10. The subject matter of claim 9 in which said pressure differential responsive means includes a cylinder having a double acting piston connected to said fuel valve for changing the setting of said fuel valve in one direction or the other in response to movement of said piston in said cylinder in one direction or the other; and an amplifier means including a slide valve having an inlet and first and second outlets, said inlet being connected to a source of vacuum and said outlets being connected respectively to opposite ends of said cylinder, movement of said slide valve from a center position increasing the vacuum applied to one outlet and decreasing the vacuum applied to the other outlet, said amplifier further including pressure responsive diaphragm means engaging said slide valve and having inlet passages on opposite sides connected respectively to receive said air pressure signal and fuel pressure signal whereby movement of the slide valve as a result of a differential pressure across said diaphragm means applies an amplified differential pressure across said double acting piston in said cylinder.

11. The subject matter of claim 10, including a vacuum accumulating chamber connected between the manifold of said internal combustion engine and the inlet of said slide valve to provide said source of vacuum.

12. The subject matter of claim 10, in which small bleeder holes are provided in the connection between said outlets and ends of said cylinder for said double acting piston to permit the proper fuel valve position to be maintained during rapid pressure changes as a result of rapid changes in inlet air flow.

* * * * *